(12) United States Patent
Carlson

(10) Patent No.: US 6,765,878 B1
(45) Date of Patent: Jul. 20, 2004

(54) SELECTIVE USE OF TRANSMIT COMPLETE INTERRUPT DELAY ON SMALL SIZED PACKETS IN AN ETHERNET CONTROLLER

(75) Inventor: Kristen Carlson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/536,895

(22) Filed: Mar. 28, 2000

(51) Int. Cl.[7] .................. H04L 12/56; G06F 13/24; G06F 15/16
(52) U.S. Cl. ............. 370/252; 370/389; 370/465; 709/232; 709/250; 709/253; 710/261; 710/266
(58) Field of Search ................... 370/230, 235, 370/252, 253, 389, 412, 428, 465, 470, 471; 709/224, 225, 230, 232, 234, 235, 238, 250, 253; 710/260, 261, 264, 265, 266

(56) References Cited

U.S. PATENT DOCUMENTS

| | | | | |
|---|---|---|---|---|
| 5,412,782 A | * | 5/1995 | Hausman et al. | 395/250 |
| 5,485,584 A | * | 1/1996 | Hausman et al. | 395/842 |
| 5,872,920 A | * | 2/1999 | Hausman et al. | 395/200.8 |
| 5,974,518 A | * | 10/1999 | Nogradi | 711/173 |
| 6,112,252 A | * | 8/2000 | Hausman et al. | 709/250 |
| 6,115,776 A | * | 9/2000 | Reid et al. | 710/260 |
| 6,304,911 B1 | * | 10/2001 | Brcich et al. | 709/237 |

* cited by examiner

Primary Examiner—Alpus H. Hsu
(74) Attorney, Agent, or Firm—Blakely, Sokoloff, Taylor & Zafman LLP

(57) ABSTRACT

A method for transmitting a data packet is disclosed. First, the size of the data packet is determined. If the size of the data packet is below a predetermined threshold size, then a transmit complete interrupt delay is set to a predetermined time. The packet is transmitted over a network. Finally, upon completing transmission of the data packet, a transmit complete interrupt is sent after waiting the predetermined time.

16 Claims, 1 Drawing Sheet

SELECTIVE USE OF TRANSMIT COMPLETE INTERRUPT DELAY ON SMALL SIZED PACKETS IN AN ETHERNET CONTROLLER

BACKGROUND OF THE INVENTION

1. Field of the Invention

The invention relates generally to Ethernet controllers, and in particular, a method for using a delay on a transmit complete interrupt only on small sized packets.

2. Background Information

Personal computers (PCs), servers, printers, and other such devices (sometimes referred to as "data terminal equipment" or DTE) are often connected together as a network or LAN. Many LANs operate according to Ethernet standards and protocols. FIG. 1 shows such a LAN 101. With Ethernet technology, all DTEs 103 in the LAN share the bandwidth of a communication medium 105 (e.g., twisted pair or coaxial cables) that connects the DTEs 103 together. All DTEs 103 in the LAN are reached anytime there is a single transmission of data in the form of "Ethernet" frames having source and destination addresses. Only the DTE 103 having the destination addresses processes the received transmission. Ethernet networks are known as "connectionless" networks because by using source and destination addresses, communication can occur without the need to first establish a connection and without immediate acknowledgement of receipt.

PCs and other devices are connected to the LAN by various Ethernet hardware interfaces installed in or coupled to these devices. For example, many PCs are equipped with Network Interface Cards (NIC) 107, such as the commonly used Ethernet NIC card and various Ethernet controller units. The terms Ethernet controller, NIC, and Ethernet NIC are synonymous as used herein. An Ethernet LAN often uses carrier sense multiple access with collision detection (CSMA/CD) methods, where different nodes listen for transmissions in progress in the communication medium before beginning to transmit.

During the reception or transmittal of Ethernet packets, the NIC must request resources from the central processor unit (CPU) of its host device. The resources may include, for example, the system bus, input/output ports, or memory. Once the transmit or receipt function is complete, the NIC may release some of the allocated resources. When a packet is received, a receive complete interrupt is generated from the NIC to the host device's CPU to inform the CPU that the NIC needs to copy the received packets into the host device's memory.

When a transmit of an Ethernet packet is complete, the NIC will generate an interrupt to the host device's CPU in order to inform the CPU that the NIC is ready to release the resources that it used to transmit the packet. This interrupt is referred to as a "transmit complete interrupt" or TxCI.

In certain cases, the TxCI is not sent by the NIC immediately upon completion of the transmittal of the Ethernet packet. Instead, a delay is imposed before the transmit complete interrupt is forwarded to the CPU. This is referred to as a transmit complete interrupt delay (TxCID). This is done because the CPU overhead associated with the transmit complete interrupt is very high. In the prior art, the TxCID is constant for all Ethernet packets.

BRIEF DESCRIPTION OF DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

The present invention relates to a method for selectively using the TxCID feature available on many Ethernet controllers. For example, the Model 8255x Ethernet controllers manufactured and sold by the assignee of the present invention each include the TxCID feature.

As noted above, the TxCI is an interrupt message sent by the Ethernet controller to the CPU of the host device upon completion of the transmittal of an Ethernet packet. The purpose of the TxCI is to allow the CPU of the host device to re-allocate system resources. In the present invention as further described below, the TxCID is selectively applied to only those Ethernet packets that are smaller than a predetermined threshold.

Figure 1:
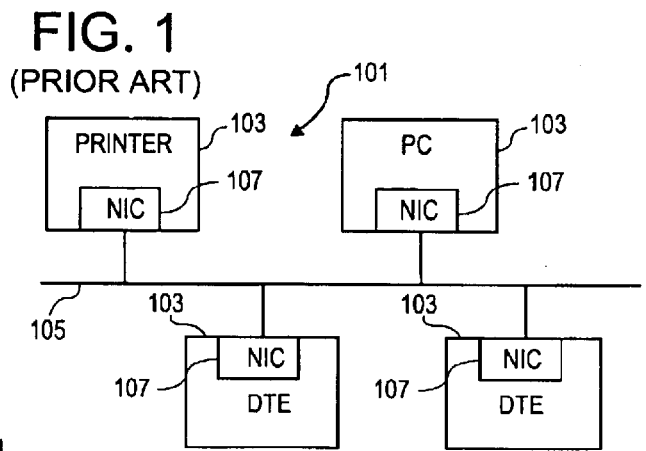
FIG. 1 shows an Ethernet network showing an Ethernet switch connecting two segments of the Ethernet network.
Figure 2:
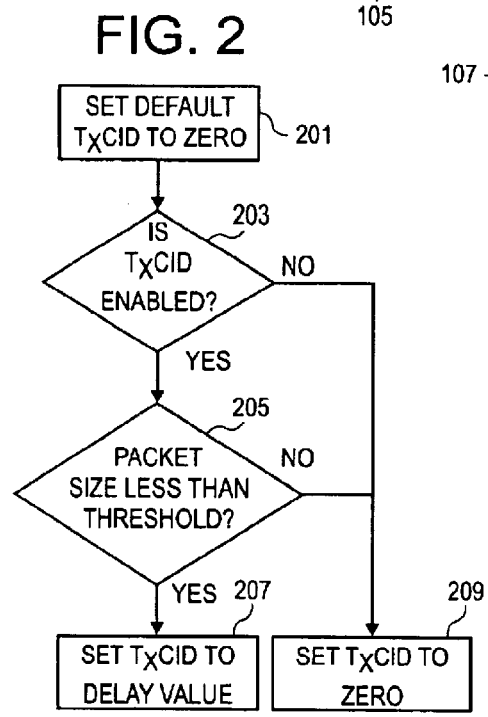
FIG. 2 is a flow diagram illustrating the method of the present invention.

Turning to FIG. 2, the method of the present invention is illustrated. First, at a step 201, the default setting for TxCID is zero. In other words, when the NIC is activated, typically by turning on the host device, the delay value on the TxCI is set to zero. Thus, there is no delay in the forwarding of the TxCI signal to the CPU upon completion of transmittal of the Ethernet packet.

Next, at step 203, a determination is made as to whether or not the transmit complete interrupt delay feature has been enabled. The term "enabled" means that the selective application of the TxCID feature is available. The "enabling" can be controlled by the user by configuration of the Ethernet controller. Thus, although the TxCID value may initially be zero, before it can be made non-zero (by enabling the TxCID feature), a determination must be made to ensure that the user did not explicitly disable the TxCID feature. Moreover, since the TxCID feature is applied dynamically, at times the value of TxCID will be zero even though the TxCID feature is enabled.

If the selective application of the TxCID feature is available, then at step 205, a determination is made as to whether or not the size of the Ethernet packet to be transmitted is less than a predetermined threshold. In the preferred embodiment, the predetermined threshold is 1024 bytes. Although the threshold in the preferred embodiment is 1024 bytes, it can be appreciated by those in the art having the benefit of this disclosure, the predetermined threshold can be optimized depending upon specific network characteristics, such as network speed. As one example, if the network is a gigabit network, the predetermined threshold may be higher. Conversely, if the network is a 10 megabit Ethernet network, the predetermined threshold may be lower. Note that the size of the Ethernet packet can easily be determined by examining predetermined fields in the Ethernet packet itself.

If the Ethernet packet is less than a predetermined threshold, then at step 207, the parameter TxCID is set to a predetermined delay value. The predetermined delay value is set forth as a number of PCI clock cycles. In one embodiment, the number of PCI clock cycles is 5888, corresponding to about 184 microseconds for a 33 MHz PCI bus system. Although the number of PCI clock cycles in the preferred embodiment is 5888, it can be appreciated by those in the art having the benefit of this disclosure, the number of PCI clock cycles can be optimized depending upon specific network characteristics. Alternatively, the predetermined delay value may be set forth as a specific delay time, typically in units of microseconds.

If, however, the Ethernet packet is larger than the predetermined threshold at step 205, or if the transmit complete interrupt delay feature is disabled, then at step 209, TxCID is set to zero in the Ethernet transmit descriptor. Ethernet controllers use an implementation dependent structure to describe the Ethernet packet to be transmitted. In the case of the 8255x Ethernet controller, there is a field in the transmit descriptor structure that specifies the value of the TxCID. Thus, if the Ethernet packet is larger than the predetermined threshold, or if the transmit complete interrupt delay feature is disabled, then the TxCID value is set to zero in the transmit descriptor structure.

Figure 3:
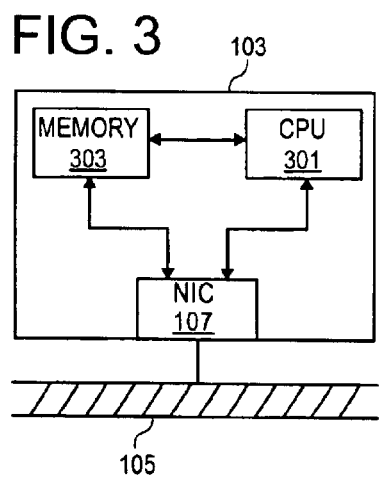
FIG. 3 is a schematic illustration of a host device implementing the method of the present invention.

The resulting method of only applying the TxCID to smaller sized packets has proven to increase throughput and reduce CPU utilization. Immediately processing the TxCI on larger sized Ethernet packetsprovides the best performance, however, on smaller sized packets, delaying the TxCI to allow processing of several packets at one time reduces software overhead, thus reducing CPU utilization. The method of the present invention can be implemented as shown in FIG. 3, which shows a DTE 103 in greater detail. The DTE 103 is also referred to as the host device. The DTE 103 includes a central processing unit (CPU) 301, a memory 303, and a network interface card (NIC) 107. The NIC 107 is also known as a network controller. In operation, the NIC 107 is the communciations interface to the Ethernet communication medium 105. Machine readable instructions that implement the method of FIG. 2 may be stored in local memory in the NIC 107 or in memory 303. The instructions are executed by the CPU 301 and/or the NIC 107.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, while the invention has been described in the context of an Ethernet LAN and an Ethernet NIC, the invention can be applied to any type of network or NIC.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for transmitting a data packet in a network comprising:
    setting a transmit complete interrupt delay (TxCID) value in the data packet to zero;
    determining that the transmit complete interrupt delay (TxCID) feature is enabled;
    determining a size of said data packet;
    if the size of said data packet is below a predetermined threshold size, setting the transmit complete interrupt delay (TxCID) value to a predetermined time;
    transmitting said data packet onto said network; and
    upon completing transmission of said data packet, sending a transmit complete interrupt (TxCI) after waiting said predetermined time.

2. The method of claim 1 wherein said network is an Ethernet network.

3. The method of claim 1 further comprising determining if a transmit complete interrupt delay feature has been enabled.

4. The method of claim 1 wherein said predetermined threshold is 1024 bytes.

5. The method of claim 1 further comprising if the size of said data packet is above said predetermined threshold, then upon completing transmission of said data packet, sending a transmit complete interrupt immediately.

6. The method of claim 1 wherein said transmit complete interrupt is sent to a host device.

7. The method of claim 1 wherein said predetermined time is 184 micro seconds.

8. A machine readable medium having stored thereon a set of instructions which when executed by a processor causes the processor to effect the following:
    set a transmit complete interrupt delay (TxCID) value in the data packet to zero;
    determine that the transmit complete interrupt delay (TxCID) feature is enabled;
    determine a size of said data packet;
    if the size of said data packet is below a predetermined threshold size, setting a transmit complete interrupt delay (TxCID) value to a predetermined time;
    transmit said data packet onto said network; and
    upon completing transmission of said data packet, sending a transmit complete interrupt (TxCI) after waiting said predetermined time.

9. The machine readable medium of claim 8 wherein said set of instructions causes the processor to further determine if a transmit complete interrupt delay feature has been enabled.

10. The machine readable medium of claim 8 wherein said set of instructions causes the processor to further determine if the size of said data packet is above said predetermined threshold, and if so, then upon completing transmission of said data packet, sending a transmit complete interrupt immediately.

11. An apparatus adapted for transmitting a data packet to a network comprising:
    a central processor unit (CPU);
    a memory; and
    a network controller operating in the following manner:
        determining that a transmit complete interrupt delay (TxCID) feature is enabled;
        determining a size of said data packet;
        if the size of said data packet is below a predetermined threshold size, setting a transmit complete interrupt delay (TxCID) value to a predetermined time.

12. The apparatus of claim 11 wherein said network is an Ethernet network.

13. The apparatus of claim 11 wherein said predetermined threshold is 1024 bytes.

14. The apparatus of claim 11 wherein said predetermined time is 184 micro seconds.

15. The apparatus of claim 11 wherein said network controller further determines if a transmit complete interrupt delay feature has been enabled.

16. The apparatus of claim 11 wherein said network controller determines if the size of said data packet is above said predetermined threshold, and if so, then upon completing transmission of said data packet, sending a transmit complete interrupt immediately to said CPU.

* * * * *